United States Patent [19]

Mahon

[11] 4,334,995
[45] Jun. 15, 1982

[54] FILTER ASSEMBLY HAVING AN EXTRUDED FILTER HEAD

[75] Inventor: Robert M. Mahon, Stoughton, Wis.

[73] Assignee: Nelson Industries, Inc., Stoughton, Wis.

[21] Appl. No.: 180,877

[22] Filed: Aug. 25, 1980

[51] Int. Cl.³ .............................................. B01D 29/24
[52] U.S. Cl. .................................... 210/340; 210/444; 210/541
[58] Field of Search ............ 210/340, 341, 423, 433.1, 210/440, 443, 444, 541

[56] References Cited

U.S. PATENT DOCUMENTS 3,598,243  8/1971  Gutkowski ........................... 210/340
3,914,176  10/1975  Holmes ............................ 210/340 X
4,192,750  11/1980  Elfes et al. ....................... 210/340 X

*Primary Examiner*—Thomas G. Wyse
*Attorney, Agent, or Firm*—Andrus, Sceales, Starke & Sawall

[57] ABSTRACT

A filter assembly having an extruded filter head. The extruded filter head is composed of a generally flat base and a domed upper section which is connected to the side edge of the base. A central wall extends between the base and the upper section and defines longitudinally extending inlet and outlet chambers, each of which has a uniform cross section throughout its length. Fluid to be filtered is introduced into the inlet chamber and is withdrawn from the outlet chamber. One or more filters are mounted on the underside of the base. Each filter is provided with an inlet opening which is connected through a port in the base to the inlet chamber and is also provided with an outlet opening which is connected through a second port in the base to the outlet chamber. The extruded construction provides improved mechanical strength for the head, and substantially reduced porosity as compared to a cast head.

7 Claims, 4 Drawing Figures

U.S. Patent  Jun. 15, 1982  Sheet 1 of 2  4,334,995
FIG.1
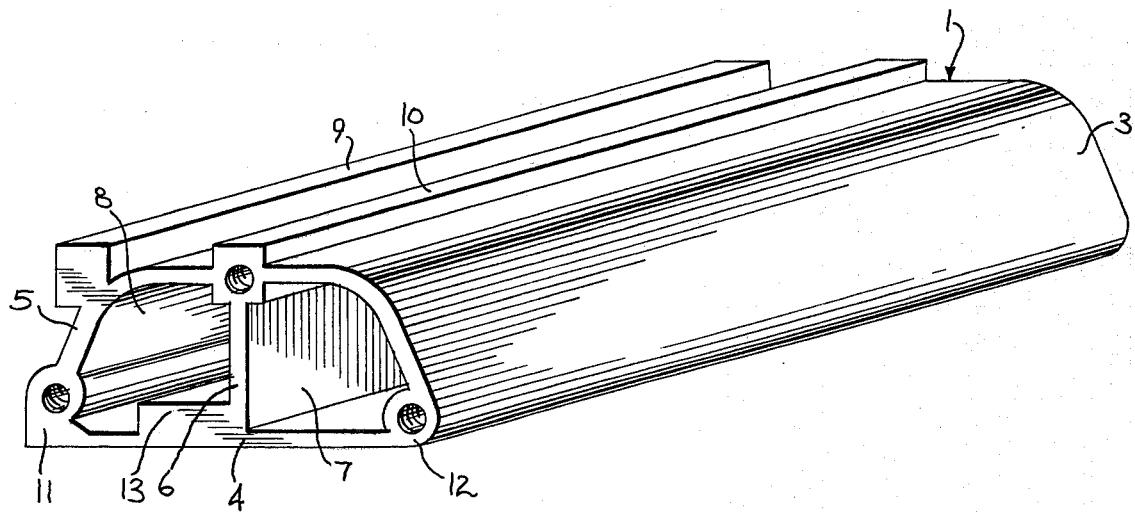
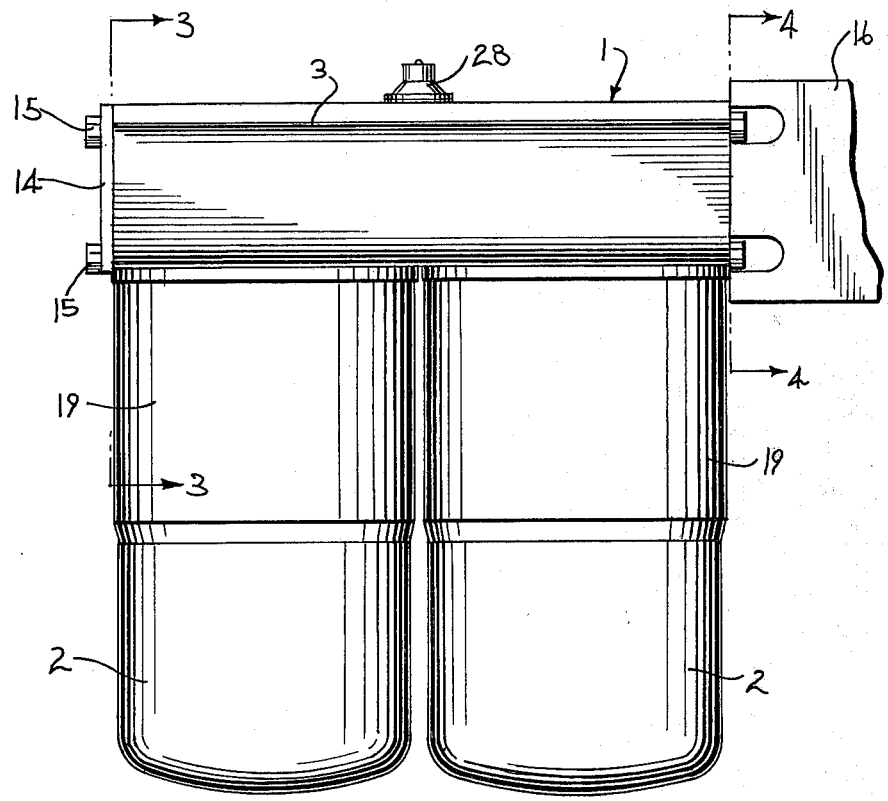
FIG.2

FILTER ASSEMBLY HAVING AN EXTRUDED FILTER HEAD

BACKGROUND OF THE INVENTION

Filters, such as those used to remove contaminants from hydraulic fluid, are frequently employed in multiple assemblies in order to reduce the size of the individual filters and yet provide the desired fluid flow capacity. In the conventional multiple filter assembly, each of the filters is connected to a cast metal head, and the heads are bolted and sealed together in order to obtain the desired parallel fluid flow through the series of filters.

The castings present porosity problems so that quality assurance against leakage normally requires an inspection on a majority of parts manufactured basis.

When the cast filter head is used on pressure side applications of a pump, the porosity can result in fluid leakage, energy consumption, and potential safety hazards. When used on suction side applications, porosity of the cast head can result in the aspiration of air or other contaminants which can be extremely damaging to the pump and will detract from the smooth operation of the system.

Because of the complex configuration of the conventional filter head, the tooling cost for the cast head is extremely high. Furthermore, the tooling cost for heads capable of being attached to multiple filters is prohibitive, so that the practice in the past has been to cast heads for a single filter and then bolt the heads together in order to obtain a multiple assembly.

SUMMARY OF THE INVENTION

The invention is directed to a filter assembly which incorporates an extruded filter head. In accordance with the invention, the extruded filter head includes a generally flat base and a domed upper section which is connected to the side edges of the base. Extending centrally between the base and the upper section is a central wall which defines a pair of longitudinally extending chambers which constitute an inlet chamber and an outlet chamber. Both chambers extend the full length of the housing and have a uniform cross section throughout their length.

One or more filters are mounted on the underside of the base and each filter is provided with an inlet that is connected through a port in the base to the inlet chamber in the head. Similarly, each filter is provided with an outlet which is connected through an outlet port in the base to the outlet chamber.

Fluid to be filtered is introduced into the inlet chamber where it flows through the individual filters and is returned to the outlet chamber for discharge to the hydraulic system.

The extruded filter head, when formed of extruded aluminum, will show a much tighter grain structure, as compared to a cast aluminum head, thereby greatly reducing the probability of leaks. In addition, the extruded structure increases the mechanical strength of the head making the head particularly suitable for pressure side applications.

The cross sectional configuration of the longitudinal extending inlet and outlet chambers can be contoured to match the contour of the supply manifold. This enables the unit to have maximum flow efficiency and eliminates the possibility of pressure drops as may occur if the fluid flows between conduits of different cross sectional configurations.

The tooling cost for the extruded head is only a fraction of that required for metal castings of comparable configuration and capacity.

The extruded filter head has great versatility in that the extrusion is merely cut to length to accommodate the desired number of filters. This greatly simplifies the assembly of multiple filter units, and eliminates the need for bolts, seals and other components as required when connecting cast heads together.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of the extruded head;

FIG. 2 is a side elevation of the filter assembly;

DESCRIPTION OF THE PREFERRED EMBODIMENT

Figure 3:
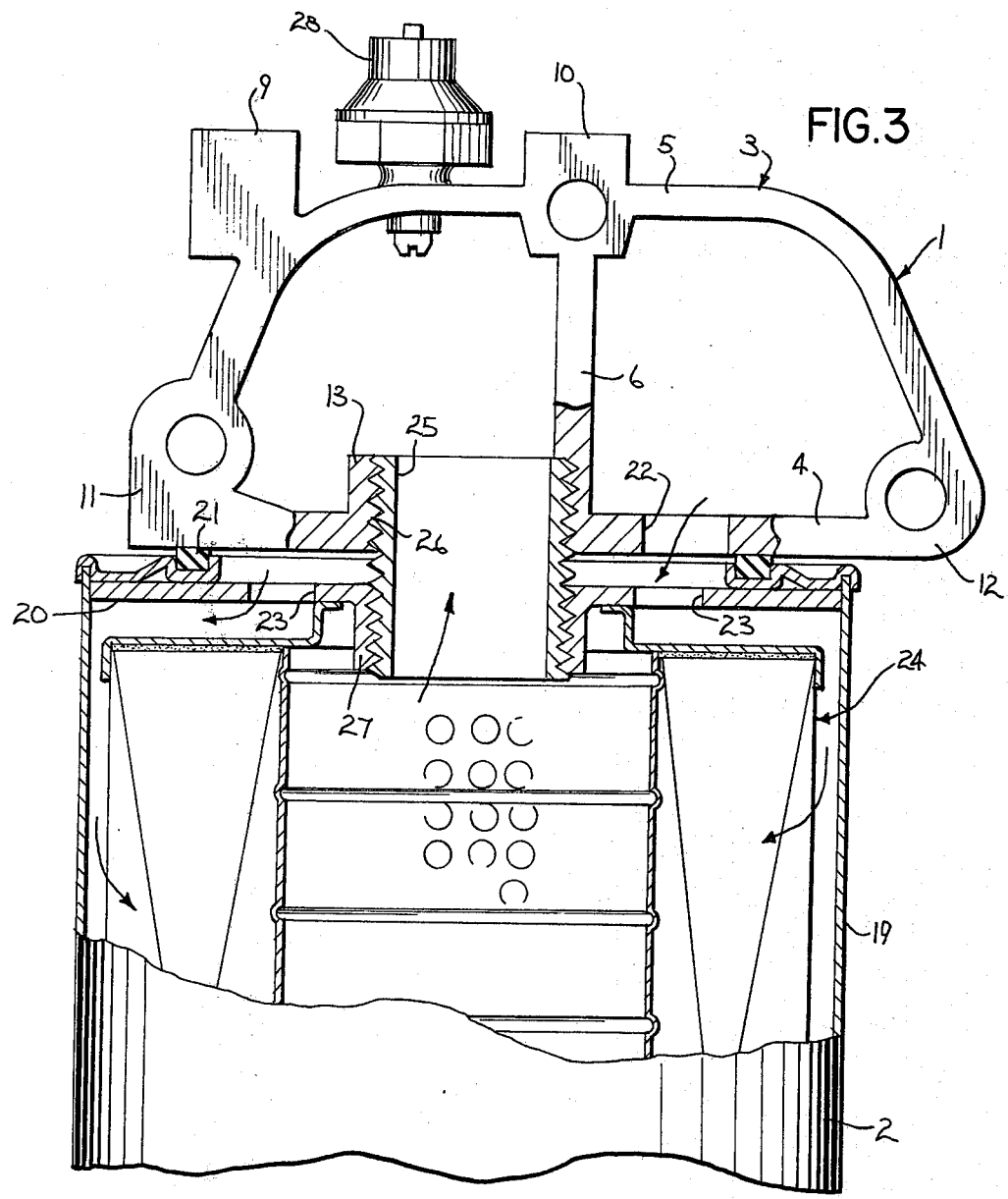
FIG. 3 is a section taken along line 3—3 of FIG. 2, with parts broken away in section.
Figure 4:
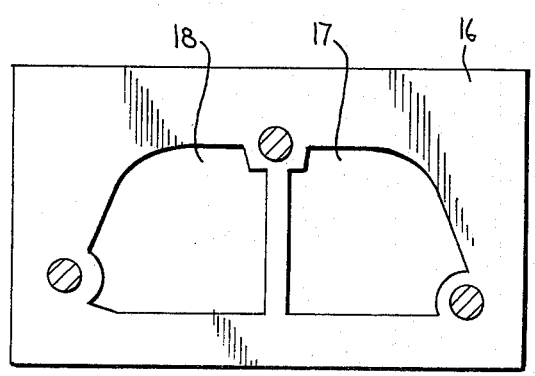
FIG. 4 is a section taken along line 4—4 of FIG. 2.

FIG. 2 shows a multiple filter assembly including an extruded head 1 which carries a plurality of filters 2. The filter assembly can be used for any type of filtering operation in which foreign materials or contaminants are removed from a fluid, and has particular use, as an example, in filtering hydraulic fluid for off-road vehicles, such as tractors.

The head 1 includes an extruded housing 3 which can be formed of metal, such as aluminum, or plastic material, such as extruded fiber reinforced thermosetting resin. The housing, as shown in FIG. 1, includes a generally flat base 4 and a curved or dome-shaped upper section 5 which is connected to the side edges of the base. Located centrally of the base 4 is a divider wall 6 which divides the housing into an inlet chamber 7 and an outlet chamber 8 which extend the full length of the housing. As the housing is extruded, the cross-sectional configuration if the chambers 7 and 8 is uniform throughout the entire length of the housing.

A pair of mounting pads or ribs 9 and 10 are formed in the upper portion of the section 5 and are adapted to be connected to the engine or other fixed supporting structure to support the filter assembly.

The housing 3 is also formed with enlarged corner sections 11 and 12, and the outlet chamber 8 is provided with a longitudinally extending shoulder 13.

As shown in FIG. 2, an end plate 14 is secured to one end of the extruded housing 3 by bolts 15 which are threaded into openings in the enlarged corners 11 and 12 and in the mounting pad 10. The opposite end of the extruded housing is connected to a manifold 16 having an inlet passage 17 which is connected to the inlet chamber 7 and having an outlet passage 18 which is connected to the outlet chamber 8. The cross sectional configuration of the chambers 7 and 8 preferably corresponds to the cross sectional configuration of the inlet 17 and outlet 18, respectively, so that the fluid flowing into and out of the head will not have to pass through conduits of different cross-sectional configuration.

The filters 2 are mounted on the underside of the base 4 and, as shown in FIG. 2, each filter includes an outer casing 19 and a cover 20 which is crimped to the open upper end of the casing. An annular gasket 21 is mounted on the upper surface of the cover 20 and engages the undersurface of the base to provide a seal therebetween.

Fluid from the inlet chamber 7 of the extruded housing 3 passes through an inlet port 22 in the base and then flows through a series of openings 23 in cover 20 into the interior of the casing. As shown in FIG. 3, the openings 23 are located radially inward of the gasket 21.

A filter element 24 of conventional construction is located within the casing and the fluid, as shown by the arrows in FIG. 3, flows in an outside-in pattern through the element 24 and is discharged through a nipple 25 which is mounted within an aperture 26 in shoulder 13 and is threaded within a flanged outlet opening 27 in cover 20. With this construction, the fluid to be filtered entering the inlet chamber 7 from the manifold inlet 17 will flow through the ports 22 into the respective filters 2, and will be discharged from the filters through the nipples 25 into the outlet chamber 8 for discharge through outlet 18 in the manifold 16.

A conventional pressure differential sensor 28 is mounted within an opening in outer section 5 and communicates with outlet chamber 8. Sensor 28 monitors the pressure differential between the inlet and outlet chambers and acts to generate a signal if the pressure differential indicates a clogged filter.

While the drawings have shown the fluid being supplied and withdrawn from the same end of the filter head, in some installations, the fluid may be introduced into one end and will be withdrawn from the opposite end. In addition, it is contemplated that the filter assembly can be used with filters having an in-out flow. In that situation, the fluid would be introduced into the chamber 8 and flow into the central portion of each filter and would be discharged to chamber 7 and then to the manifold.

The extruded filter head provides distinct advantages over the cast head, as used in the past. The extruded head had a much tighter grain structure than a casting and this substantially reduces the leakage potential. Furthermore, the extruded part has greater mechanical strength than a cast head of similar contour and capacity, thereby making the extruded head particularly applicable for pressure side applications.

As a further advantage, the configurations of the extrusion can be varied, so as to conform the cross section of the internal chambers 7 and 8 with the cross-sectional configuration of the manifold to thereby increase the efficiency of flow. When using a cast head the passages are normally of circular cross section which may not conform to the shape of the passages in the supply manifold.

The tooling cost for the extrusion is substantially lower than that of a cast part. Furthermore, the extrusion can be used for multiple filter assemblies by merely cutting the extruded head to the desired length and drilling the inlet and outlet ports 22 and 26 at the desired locations. This is a substantial advantage over the use of a cast head because castings, in the past, have been bolted and sealed together and that type of assembly involves substantial labor costs and the bolted construction can result in potential leakage at the sealed joints.

The term "filter" as used in the specification and claims is intended to include any type of fluid strainer or separating device.

Various modes of carrying out the invention are contemplated as being within the scope of the following claims particularly pointing out and distinctly claiming the subject matter which is regarded as the invention.

I claim:

1. An extruded filter head for a filter comprising a housing composed of a generally flat base and an upper section secured to the side edges of the base, a wall extending longitudinally the full length of the housing and connecting the base and the upper section and dividing the housing into a pair of longitudinally extending side-by-side chambers that extend the full length of the housing, each of said chambers having a uniform cross section throughout its entire length, one of said chambers comprising an inlet chamber and the other of said chambers comprising an outlet chamber, inlet means for introducing a fluid to be filtered into said inlet chamber, outlet means for withdrawing the fluid from the outlet chamber, at least one inlet port disposed in the base and providing communication between the inlet chamber and the inlet of a filter connected to the base, and at least one outlet port formed in the base and providing communication between the outlet chamber and the outlet in said filter.

2. The filter head of claim 1, and including a nipple secured within one of said ports and extending outwardly of said base, the outer end of said nipple being threaded and adapted to be engaged within an aperture in said filter.

3. The filter head of claim 1, wherein said head includes a group of inlet ports spaced along the length of said housing and a group of outlet ports spaced along the length of the housing.

4. The filter head of claim 3, and including an enlarged shoulder extending upwardly from said base into one of said chambers and extending the full length 5. A filter assembly, comprising an elongated extruded filter head composed of a housing including a generally flat base and an outer section connected to the side edges of said base, said housing also including a central wall extending between the base and said outer section and dividing said housing into a pair of longitudinal side-by-side chambers, each chamber extending the full length of the housing and having a uniform non-circular cross section throughout its length, one of said chambers being an inlet chamber and the other of said chambers being an outlet chamber, inlet means connected to one end of the inlet chamber for supplying a fluid to be filtered to said inlet chamber, outlet means connected to one end of the outlet chamber for withdrawing the fluid from the outlet chamber, a filter mounted on the underside of the base, said filter having a fluid inlet opening and a fluid outlet opening, an inlet port formed in the base and connecting the inlet chamber with the fluid inlet opening of the filter, whereby fluid can flow from the inlet chamber to the filter, and an outlet port formed in the base and connecting the outlet chamber with the fluid outlet opening of the filter, whereby fluid from the filter can flow through the outlet port to the outlet chamber, a nipple mounted in one of said ports and extending outwardly of the base, the outer end of said nipple being threaded, one of said openings being threaded to receive the nipple, threading of said one opening on said nipple bringing said filter into tight sealing engagement with the outer surface of said base.

6. The assembly of claim 2, and including a mounting rib disposed on the exterior of the housing and extending the length of said housing.

7. The assembly of claim 5, and including a plurality of filters mounted on the base, said base having a plurality of inlet ports connecting the inlet chamber with the respective fluid inlet openings of the filters, and said base having a plurality of outlet ports connecting the outlet chamber with the respective fluid outlet openings of the filters.

* * * * *

UNITED STATES PATENT AND TRADEMARK OFFICE
CERTIFICATE OF CORRECTION

PATENT NO. : 4,334,995
DATED : June 15, 1982
INVENTOR(S) : ROBERT M. MAHON

It is certified that error appears in the above-identified patent and that said Letters Patent are hereby corrected as shown below:

Col. 3, line 32, Cancel "inout" and substitute therefor ---in-out---; Col. 3, line 38 Cancel "had" and substitute therefor ---has---; Col. 4, line 30, CLAIM 4, After "length" insert ---of said housing, one of said groups of ports being disposed in said shoulder.---

Signed and Sealed this

Fourteenth Day of September 1982

[SEAL]

Attest:

Attesting Officer

GERALD J. MOSSINGHOFF

Commissioner of Patents and Trademarks